Feb. 9, 1971 J. RUBIN 3,561,226
REFRIGERATING SYSTEM FOR TRANSPORTABLE VEHICLES
Filed Oct. 7, 1968
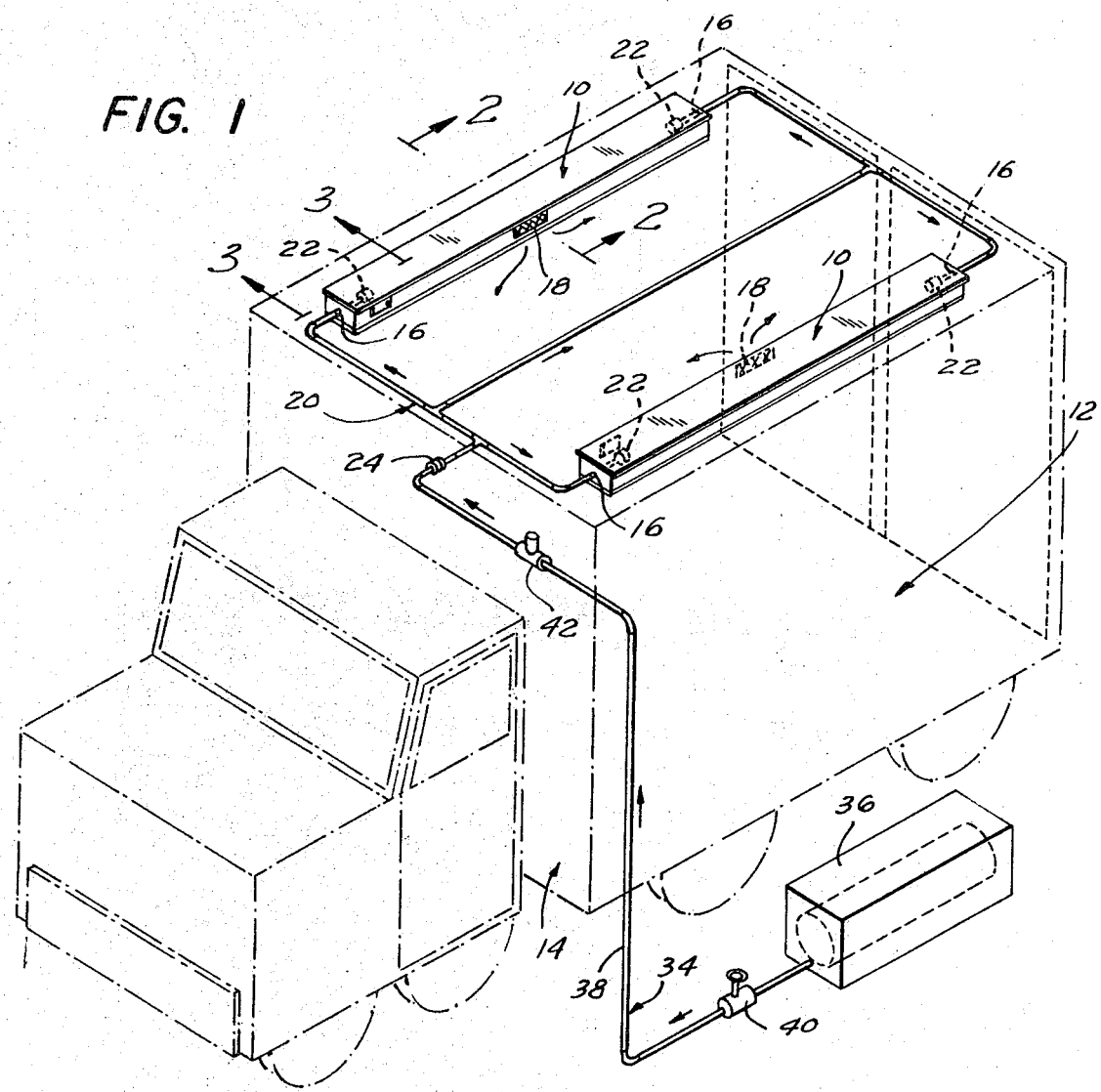
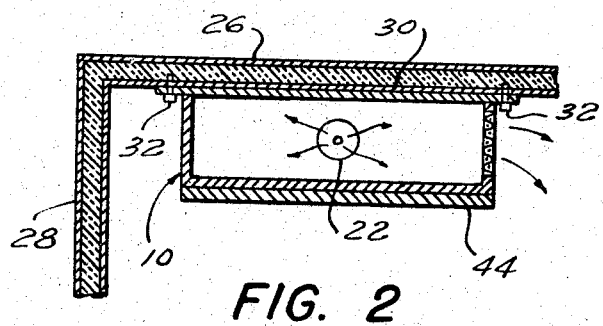
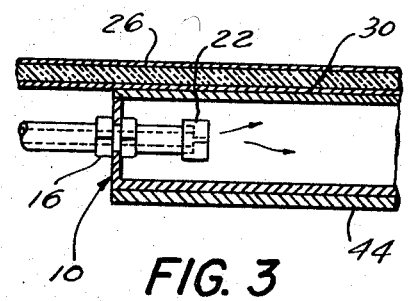
INVENTOR
JULIUS RUBIN
BY
*James & Franklin*
ATTORNEY United States Patent Office 3,561,226
Patented Feb. 9, 1971

3,561,226
REFRIGERATING SYSTEM FOR TRANSPORTABLE
VEHICLES
Julius Rubin, 54 Madison Ave.,
Franklin Square, N.Y. 11010
Filed Oct. 7, 1968, Ser. No. 765,502
Int. Cl. F25c 1/00
U.S. Cl. 62—66
8 Claims

ABSTRACT OF THE DISCLOSURE

A method and apparatus for refrigerating a chamber in trucks, rail cars and the like adapted for transporting products requiring refrigeration, in which the source of refrigeration is a container mounted in said chamber which container is filled by a block of solid refrigerant formed by flowing into said container a pressurized liquid refrigerant under a controlled pressure and velocity to produce solid refrigerant flakes which are caused to move through the length of the container and pack the refrigerant flakes densely therein to form said block of solid refrigerant.

This invention relates to a refrigeration system for transportable vehicles, and more particularly to a method and apparatus for refrigerating a chamber in trucks, rail cars and the like adapted for transporting products, such as frozen foods requiring refrigeration.

A number of methods have been used for refrigerating transportable vehicles requiring refrigeration for the frozen foods or products carried therein. According to one method, the truck is precooled by injecting into the truck, the walls of which latter are insulated, a spray of carbon dioxide snow derived either from a central supply or one that may be carried by the truck itself. The supply or source comprises a container or tank liquid carbon dioxide under pressure. The truck is sprayed with solid carbon dioxide initially (when the frozen food is loaded onto the truck), and also at suitable intervals dictated by the intermittent reduction in temperature that takes place in the truck. This intermittent spraying procedure is necessary due to the fact that the carbon dioxide snow injected into the truck space or chamber quickly dissipates and the reduced temperature effected, in itself not of an initial very low character, does not last very long.

Other known methods include the use of separate compartments either located in or associated with the food carrying chamber of the truck in which cakes of solid carbon dioxide are stored, a ducting system being connected to the compartment for circulating gaseous carbon dioxide from the compartment to the various walls of the truck. According to a variation of this method, a cargo cooler comprising a separate carbon dioxide containing chamber located in the truck is used for cooling a mass of air which is then circulated or blown into the truck body.

In the refrigerating system of the present invention, a refrigerant container or "cold plate" closed except for a liquid refrigerant intgess and a spent refrigerant gas egress is mounted in the truck chamber, a pressurized liquid refrigerant is flowed into said container at its point of ingress, at which point the liquid refrigerant is converted and formed into solid refrigerant flakes, and the velocity and pressure of the flow of the liquid refrigerant and the speed of formation of the refrigerant flakes is controlled so as to move the refrigerant flakes through the length of the container and pack the refrigerant flakes densely therein to form a block of solid refrigerant filling the container. The refrigerant container so processed forms the cold plate source or locus for the refrigeration for the chamber. The gas egress of the container acts as the exit point or region for the spent gas sublimated from the refrigerant flakes and the solid refrigerant block in the course of forming and expending the refrigerant.

The preferred refrigerant employed is liquid $CO_2$ converted to solid Dry Ice. In the process, therefore, liquid $CO_2$ is injected at one end into the cold plate container at the time refrigeration is desired in a given chamber. The $CO_2$ expanding into the container through a nozzle orifice or nozzle orifices therein from a pressure of about 300 p.s.i. to virtually atmospheric, turns itself or is converted into solid flakes of Dry Ice snow and $CO_2$ vapor. The vapor passes through a screened aperture (the point of egress) located toward the other end, and in the structure herein exemplified, about midway along the side of the cold plate container. The snow is trapped by the screen and builds up in the container until it is completely filled. The velocity and pressure of the $CO_2$ issuing through the $CO_2$ nozzles into the cold plate container helps pack the snow quite densely, forming a fairly solid cake of Dry Ice which retains a large refrigeration capability for a given plate size. The amount of $CO_2$ going into the container depends, of course, on its size, the size of the nozzle orifices, the injection time and the pressure at which the liquid $CO_2$ is stored. The amount is controlled by hand valving and can be controlled automatically, if desired, through the use of an automatic timer and solenoid valve. In practice, it has been found possible to fill a container 20" wide x 10' long x 3" deep with snow in about 10 minutes. It has also been found virtually impossible to overfill these containers, as a backup of snow at the nozzle stops the flow of $CO_2$ into the containers.

The temperature of the cold surfaces of the cold plate container charged with $CO_2$ being 110° F. below zero, it is desirable to insulate these surfaces to prevent overchilling of cargo and to avoid waste of $CO_2$. The insulation can be varied to coincide with the average temperature desired in refrigerating a given commodity. As with the conventional cold plate, the heat absorption rate and refrigeration potential is predictable with the present $CO_2$ method with the addition that the quantitities of $CO_2$ necessary can be varied to suit situations. In cases where a $CO_2$ atmosphere is not desirable in the cargo space, the $CO_2$ issuing from the cold plate may be vented outside of the refrigerated area.

The liquid $CO_2$ is normally stored in an insulated refrigerated storage unit which operates normally at about 300 p.s.i. and 0° F. Colder temperatures of the liquid $CO_2$ can be obtained under certain conditions for more economical $CO_2$ usage. Insulated copper tubing or steel pipe may be used to carry the liquid $CO_2$ from its source to the points of use. The source may be established at one or more central supply points, access to which may be had either at the beginning of the run of the truck or at suitable extended intervals. For portable work, quick connect couplings may be utilized to facilitate the connection between the $CO_2$ storage tank and the nozzle manifold of the cold plate container. The charging of the units may be done at any time before or after loading the product to be refrigerated and with the doors open or closed. Recharging of the cold plates may be done at any time without opening the doors or distributing the load.

To the accomplishment of the foregoing object and such other objects as may hereinafter appear, the present invention relates to a refrigerating system for transportable vehicles as is more particularly sought to be defined in the appended claims, taken together with the following specification and the accompanying drawing, in which:

FIG. 1 is a perspective view of the refrigerating system of the present invention mounted on a transportable vehicle such as a truck;

FIG. 2 is a partial view shown to an enlarged scale of the refrigerant system mounted in the refrigerating chamber of such vehicle, said view being taken in cross section in the plane of the line 2—2 of FIG. 1; and FIG. 3 is a view of the same taken in cross section in the plane of the line 3—3 of FIG. 1.

Referring now more in detail to the drawing, and having reference first to FIG. 1 thereof, the refrigerating system of the invention comprises one or more refrigerant containers 10, 10 mounted in a refrigerant chamber 12 of a transportable vehicle such as a truck 14 (the latter shown in phantom), each of said containers 10 (where more than one container is employed) being closed as clearly depicted in FIG. 1 of the drawing except for one or more openings 16—16 comprising points of ingress for a pressurized liquid refrigerant and an opening 18 comprising a region of egress for a spent refrigerant gas, piping generally designated as 20 for the liquid refrigerant being connected to said container or containers at said points of ingress 16, 16. Said piping includes an orificed nozzle 22 at each point of ingress located within the container where the liquid refrigerant is converted and formed into solid refrigerant flakes. The egress opening 18 comprises for each container an orifice member such as a wire screen 18. The said piping 20 comprises connected pipes originating in a quick connectable coupling 24 and terminating in the orificed nozzles 22, 22; and where a plurality of containers are used, the piping is arranged in the manner shown in FIG. 1 of the drawing, the flow of the liquid refrigerant therethrough to the containers 10, 10 being indicated by the arrows in FIG. 1.

More specifically, each container 10 comprises an elongated receptacle of relatively narrow depth attached to and suspended from the roof 26 of the vehicle, which latter as well as the walls 28 of the vehicle are suitably insulated, the attachment being attained by adhesive attachment of the top of the container to the roof of the vehicle as at 30 and by additional securing means 32, 32, as best shown in FIG. 2 of the drawing. Each container, in the illustrated form of the invention, is given dimensions to effect the optimum production of the end product; and in the preferred form exemplified each container is given the following dimensions: 10′ long x 12″ wide x 3″ deep. The two containers depicted are arranged as shown in order to secure the maximum head space in the truck as well as to facilitate the production of the end product in an efficient manner.

In the vehicle carried refrigerating system thus far described, a liquid refrigerant under pressure and, more particularly, liquid $CO_2$ is injected at one end of the container or "cold plate" refrigerating system at the coupling 24, and the liquid refrigerant is conveyed through the piping 20 to the orificed nozzles 22. The liquid $CO_2$ entering each container at the nozzles expands therein from a pressure of about 300 p.s.i., as further described below, to virtually atmospheric, turning itself or being converted into solid flakes of Dry Ice snow and $CO_2$ vapor. The vapor passes through the screened aperture 18 (the point of egress) located at a region of each container opposite to the nozzle, and in the structure herein exemplified, the screened aperture is located midway the side of each cold plate container. The formed snow is trapped by the screen and builds up in the container until the container is completely filled. The velocity and pressure of the liquid $CO_2$ issuing through the nozzles into each cold plate container helps pack the snow quite densely, forming a fairly solid cake of Dry Ice which retains a large refrigeration capability for a given plate size.

For supplying the liquid refrigerant to the vehicle carried refrigerating system there is employed a source of liquid refrigerant generally designated as 34. This source may be, and preferably is, established at one or more central supply points, access to which may be had either at the beginning of the run of the truck or at suitable extended intervals. Such a source comprises a $CO_2$ liquid storage unit 36 connected by means of piping 38 to the quick connectable coupler 24, the piping being provided in this line with a hand supply valve 40 and with a solenoid valve 42, the latter acting as a timer control means. The storage unit 36 is an insulated refrigerated unit which operates normally at about 300 p.s.i. and 0° F. Colder temperatures on the liquid $CO_2$ can be obtained under certain conditions for more economical $CO_2$ usage.

The temperature of the exposed cold surfaces of the cold plate containers charged with $CO_2$ being 110° F. below 0, it is desirable to insulate these surfaces as at 44 (see FIGS. 2 and 3) to prevent over chilling of the cargo and to avoid waste of $CO_2$. The source of refrigeration for the truck chamber 12 is localized at the exposed surfaces of the cold plate containers 10, 10. The insulation applied to the containers can be varied to coincide with the average temperature desired in refrigerating a given commodity. Where a $CO_2$ atmosphere is not desirable in the cargo space, the wire screen openings 18, 18 may be arranged so that the issuing $CO_2$ during the refrigeration spending period may be vented outside the chamber 12. As will be understood from the foregoing, the spent $CO_2$ gas sublimated from the $CO_2$ snow flakes in the course of their pressured flow into the containers as well as the spent gas thereafter sublimated during the refrigeration period make exit at the gas point of egress 18, 18.

The functioning of the present method of refrigeration and the apparatus employed therefor while apparent from the above detailed description, may be further viewed when the same is compared with prior art processes and apparatus, the system of the present invention being characterized by the following advantages:

It eliminates the need for the mechanical equipment referred to used in certain prior art methods. Lightweight plates are used which allow more payload. There is no fluid to leak out of the plates or any repairs necessary, as the containers are always either filled with a solid or are empty. It allows more storage space in the refrigerated chamber. Fans or auxiliary equipment to circulate air are not necessary. Open meats and other moist products are not dehydrated as when refrigerated under large quantities of moving cold air. There is positive refrigeration; once a given quantity of $CO_2$ is introduced into the plates, it will absorb a predetermined amount of heat and disappear without a residue. There is fast charging; refrigeration starts instantly as $CO_2$ is injected; filling of an average container takes less than 10 minutes as contrasted with several hours for recharging much warmer cold plates. Low cost, lightweight sheet metal plates are suitable with no special materials needed for lines or nozzles. Units may be manifolded as shown for more versatility. There is no storage loss of refrigerant as with Dry Ice or liquid nitrogen. Loading is done from outside the refrigerated space without disturbing load or using up cargo space. The block filled cold plates or containers disclosed, although of relatively low overall volume compared to the volumetric dimensions of the truck chamber, are formed to last through a long run in the range of 18 hours, and more particularly from 15 to 18 hours, depending on the weather and the number of times the truck chamber is opened for product unloading in a given run.

It will be apparent that many changes may be made in the structure as well as the process involved in the system of the present invention without departing from the spirit of the invention defined in the following claims.

I claim:
1. The method of refrigerating a chamber in trucks, rail cars and the like adapted for transporting products requiring refrigeration which consists, in mounting in the upper region of said chamber of refrigerant container having a horizontally disposed cold plate acting as a direct refrigerating source for the chamber, said container being closed except for a liquid refrigerant ingress and a spent refrigerant gas egress, flowing a pressurized liquid refrigerant into said container at the point of said ingress at which point the liquid refrigerant is converted and formed into solid refrigerant flakes, and controlling the velocity and pressure of the flow of the liquid refrigerant and the speed of formation of the refrigerant flakes to move the refrigerant flakes through the length of said container and pack the refrigerant flakes densely therein to form a block of solid refrigerant filling said container, the spent gas sublimated from said flakes in the course of said flow and refrigeration making exit at said gas egress.

2. The method of claim 1 in which the liquid refrigerant is liquid $CO_2$, the refrigerant flakes are solid flakes of Dry Ice snow, and in which the said flow is controlled to form a block of solid Dry Ice filling the container.

3. The method of claim 1 in which said liquid refrigerant ingress comprises points of ingress located at opposite ends of the closed container and the gas egress is located at a region midway said points of ingress, whereby the refrigerant flakes are formed at opposite ends of the container and move towards each other and toward the gas egress to unite and form the block of solid refrigerant filling the container.

4. An apparatus for refrigerating a chamber in trucks, rail cars and the like adapted for transporting products requiring refrigeration, comprising a refrigerant container mounted in the upper region of the refrigerating chamber, said container having a horizontally disposed cold plate acting as a direct refrigerating source for the chamber, said container being closed except for an opening comprising a point of ingress for a pressurized liquid refrigerant and an opening comprising a region of egress for a spent refrigerant gas, piping for the liquid refrigerant connected to said container at said point of ingress, said piping including an orificed nozzle within the container where the liquid refrigerant is converted and formed into solid refrigerant flakes and vapor, and means connected to said piping for controlling the velocity and pressure of the flow of the liquid refrigerant to and through said nozzle and the speed of formation of the refrigerant flakes for moving said flakes through the length of said container and pack the flakes densely therein to form a block of solid refrigerant filling said container.

5. The refrigerating apparatus of claim 4 in which said container comprises an elongated receptacle of relatively narrow depth extending over a length of the refrigerating chamber.

6. The refrigerating apparatus of claim 5 in which the said orificed nozzle is located at one end of said elongated receptacle, and the egress opening comprising a screen, is located at a region of said receptacle where it traps the solid flakes to build the same up in the container to fill the container.

7. The refrigerating apparatus of claim 5 in which the receptacle has points of ingress located at opposite ends of the closed container and the gas egress is located at a region midway said points of ingress, whereby the refrigerant flakes formed at the nozzle at said points of ingress move toward each other and toward the gas egress to unite and form the block of solid refrigerant filling the container.

8. The refrigerating apparatus of claim 4, in which the refrigerating surface of the horizontal cold plate of the refrigerant container is insulated, thereby preventing overchilling of the refrigerating chamber and avoiding waste of $CO_2$.

References Cited
UNITED STATES PATENTS

| | | | |
|---|---|---|---|
| 2,475,755 | 7/1949 | Pearson | 62—514X |
| 3,316,726 | 5/1967 | Pauliukonis | 62—514 |

MEYER PERLIN, Primary Examiner

U.S. Cl. X.R.

62—388, 514